Patented May 3, 1949

2,468,798

UNITED STATES PATENT OFFICE 2,468,798

MODIFIED STYRENE-LINSEED OIL INTERPOLYMERS

Arthur E. Young and Harold M. Hoogsteen, Midland, Mich., assignors to The Dow Chemical Company, Midland, Mich., a corporation of Delaware No Drawing. Application June 25, 1947,
Serial No. 757,063

7 Claims. (Cl. 260—23)

This invention pertains to certain modified interpolymers of styrene and linseed oil which are adapted for use in coating compositions and to a method of making the interpolymers. It also concerns coating compositions comprising the interpolymers.

It is known that styrene and linseed oil may be interpolymerized in the presence of solvents to form products that are soluble in aromatic solvents and that may be cast from the solutions as films which, when dried, are tack-free at room temperature. However, these known interpolymers possess certain objectionable characteristics that render them poorly suited for use in varnishes, enamels, and other coating compositions. Solutions containing the interpolymers in a concentration such as to lay down a varnish film of usual thickness are generally of too low a viscosity for convenient application, e. g. with a brush. In this connection it may be mentioned that for formation of a film of suitable thickness, solutions of such interpolymers in toluene or other aromatic solvents may advantageously be of about 50 per cent concentration, although somewhat lower or higher concentrations, e. g. from 40 to 70 per cent by weight, may in some instances be used, and that for convenient application with a brush, varnish solutions having Gardner-Holdt viscosities greater than B, and preferably from E to H, are generally desired. Fifty per cent solutions of the above-mentioned known interpolymers, e. g. in toluene, generally have viscosities not greater than B and usually of A or less. Furthermore, although dried films of such interploymers are non-tacky at room temperature, their thermoplasticity properties are such that they become tacky at only moderately elevated temperatures, e. g. at temperatures in the order of from 140° to 150° F.

It is an object of this invention to provide certain new modified interpolymers of styrene and linseed oil which are readily soluble in aromatic liquids to form varnishes of a concentration and viscosity suitable and convenient for application, e. g. by brushing, dipping, or in other usual ways, to form protective films of usual thickness, which films, after being dried or cured, remain non-tacky at temperatures above those at which the aforementioned known interpolymers of styrene and linseed oil become tacky. Another object is to provide a method of making the new interpolymers. A further object is to provide coating compositions, particularly varnishes, comprising the new interpolymers. Other objects will be apparent from the following description of the invention.

We have found that under certain conditions hereinafter described, minor amounts of divinylbenzene may be interpolymerized with major amounts of linseed oil and one or more mono-alkenyl aromatic compounds, including styrene, to obtain polymeric products which are readily soluble in aromatic liquids to form solutions of a concentration and viscosity well adapted for application as a varnish. For instance, 50 per cent solutions of these interpolymers in toluene have Gardner-Holdt viscosities greater than B, the exact value being dependent upon the relative proportions of the polymerizable starting materials and the conditions under which the polymerization is carried out. We have further found that dried films of these interpolymers remain non-tacky at temperatures sufficiently elevated to render tacky the aforementioned known interpolymers of styrene and linseed oil. Dried films of the new interpolymers remain non-tacky at well above mid-summer temperatures for all parts of the world.

However, in order to obtain polymeric products having the above-mentioned desirable properties, it is important that the directions hereinafter given for making the same be adhered to closely. It is particularly necessary that the proportions of divinylbenzene which are specified be employed.

The polymerizable materials employed in preparing the interpolymers comprise: (a) one part by weight of linseed oil and (b) from 0.5 to 1.2, preferably about one, part of alkenyl aromatic compounds including styrene as a major component and divinylbenzene as a minor component. Other alkenyl aromatic compounds which may be present in minor amounts are alkylated styrenes such as alpha-methyl-styrene, para-methyl-alpha-methyl-styrene, vinyl-toluene, or ethyl-vinylbenzene, etc. However, the alpha-methylated styrene compounds, e. g. alpha-methyl-styrene, modify somewhat the polymerization reaction and the proportions of divinylbenzene which may satisfactorily be used. In general, the range of proportions of divinylbenzene satisfactory for use in the invention becomes narrower with increase in the proportions of alpha-methylated styrene compounds in the polymerization mixture. For this reason, the proportion of alpha-methylated styrene compounds should not exceed 35 per cent, and is preferably less than 32 per cent, of the combined weight of all of the alkenyl aromatic reactants. As indicated above, alpha-methylated styrenes may be omitted from the polymerization mixture.

The proportions of divinylbenzene, expressed as per cent of the combined weight of all of the alkenyl aromatic starting materials, which may satisfactorily be used are in a range of from:

Per cent DVB$=2+0.03143$ A to

Per cent DVB$=4-0.02571$ A and are preferably in a range of from:

Per cent DVB = 2.2 + 0.02424 A to

Per cent DVB = 3.6 − 0.01818 A in which equations DVB is an abbreviation of divinylbenzene and A represents the per cent by weight of alpha-methylated styrene compounds, e. g. alpha-methyl-styrene, based on the combined weight of all of the alkenyl aromatic compounds. Employment of the divinylbenzene in proportions appreciably smaller than those just given results in formation of a polymer which, when dissolved as a 50 per cent solution thereof in toluene, is too thin for convenient application as a varnish by brushing. Employment of the divinylbenzene in proportions appreciably greater than those given above, usually results in gelation of the product during polymerization and in formation of a non-uniform product which is not sufficiently soluble in aromatic solvents.

The polymerizable starting materials in the relative proportions just given are dissolved in a substantially inert solvent to form a solution containing a total of from 40 to 80, preferably from 50 to 65, per cent by weight of the polymerizable materials. Employment of a solvent as a medium for the polymerization reaction is of importance, since the products obtained when the polymerization is accomplished in the absence of such medium form solutions which when of 50 per cent concentration, e. g. in toluene, are too thin for convenient use as a varnish. Also, after being applied as a film and dried, the interpolymers formed in the absence of a solvent become tacky at lower temperatures than do similar films of the interpolymers of the invention. Examples of organic liquids which may be employed as media for the polymerization reaction are toluene, xylene, mesitylene, ethylbenzene, diethylbenzene, chlorobenzene, ortho-dichlorobenzene, and mineral spirits, etc. Aromatic solvents are preferred as media for the reaction.

Minor amounts of polymerization catalysts such as benzoyl peroxide, lauroyl peroxide, or acetyl peroxide, etc., may be added for purpose of increasing the rate of polymerization, but a catalyst is not required. Catalysts of the peroxide type appear to cause a decrease in the average molecular weight of the polymeric products, as is evidenced by a decrease in the viscosity of 50 per cent solutions of the products in toluene, and this effect becomes more pronounced with increase in the proportion of a peroxide employed in the reaction. In most instances, peroxides may satisfactorily be used in amounts corresponding to between 0.1 and 3 per cent of the total weight of the materials to be polymerized, and there are instances in which they may be used in somewhat larger proportions.

The mixture of starting materials is usually prepared as just described and is thereafter heated to effect polymerization, but, if desired, the linseed oil solution may be heated at a polymerizing temperature and the alkenyl aromatic compounds be added gradually to the heated oil.

The polymerization is accomplished by heating the mixture, preferably in a closed container or in contact with an inert gas such as nitrogen, carbon dioxide, or mixtures of these compounds, etc., at temperatures between 100° and 200° C., but lower or somewhat higher temperatures may be employed. The reaction is continued until at least 80 per cent, and preferably more than 95 per cent, of the alkenyl aromatic components of the mixture have been consumed, and a 50 per cent solution of the polymeric product has a Gardner-Holdt viscosity greater than B. In general, the viscosity becomes greater with increase in the time of heating the polymerization mixture and by periodically withdrawing and determining the viscosity of samples of the mixture, the reaction may be discontinued when the product possesses a desired viscosity value. The proportion of the alkenyl-aromatic components remaining unpolymerized may be determined by periodically testing samples of the reaction mixture in known ways, e. g. to determine the degree of unsaturation of such sample. The time required for the polymerization varies depending upon the polymerization temperature and the kinds and proportions of starting materials employed, but is usually in the order of from twenty hours to three days.

By the procedure just described, the interpolymers may be obtained as clear transparent resinous bodies which may readily be dissolved in usual varnish solvents, e. g. aromatic solvents such as benzene, toluene, xylene, ethylbenzene, or a mixture of one or more of such aromatic solvents with mineral spirits, to form varnishes suitable for application to surfaces of wood, cloth, paper, or metals, etc. In most instances, a mixture of one part by volume of an aromatic solvent and between 0.75 and 1.25 parts of mineral spirits has been employed by us in preparing such varnishes. Usually, the varnish is prepared so as to contain from 40 to 65, preferably from 45 to 55 per cent by weight of the dissolved interpolymer, but it may be of lower or higher concentrations. Other usual addition agents such as rosin, resin, drying oils, paint driers, or coloring agents such as dyes or pigments, etc., may be added. By intimately admixing a finely ground pigment with the varnish, an enamel may be obtained.

Upon applying the varnish or enamel to a surface, e. g. by brushing, and permitting the resultant film to stand in contact with air at room temperature, the film usually appears dry to the touch in from 1 to 3 hours and is hardened satisfactorily in from 8 to 24 hours. Such films may be hardened more rapidly, e. g. in from 1 to 3 hours, by heating the same at a temperature of about 120° C. The cured films are clear, uniform and of good appearance. They are non-tacky at room temperature and remain free of tack, i. e. they are not sticky, at moderately elevated temperatures such as 150° F. or higher. They adhere well to most surfaces, e. g. of wood, paper, cloth, or metal, etc., on which they are formed. Accordingly, the varnishes and enamels are well adapted for general use as coating compositions.

The following examples describe certain ways in which the invention has been practiced, but are not to be construed as limiting its scope.

*Example 1*

In each of a series of experiments, a solution of alkali refined linseed oil, styrene of approximately 99 per cent purity, alpha-methyl-styrene of approximately 98 per cent purity, ethyl-vinylbenzene, divinylbenzene, benzoyl peroxide, and a solvent, consisting of a petroleum fraction boiling over a temperature range of from 270° to 351° F. and containing approximately 93.5 per cent by weight of aromatic hydrocarbons together with minor amounts of naphthenes and paraffinic hydrocarbons, was heated under reflux in an open container at a temperature of 150° C. for the time stated in the following table. The mixture was then cooled and inspected. In some instances the resultant polymers had coagulated as gels which were nearly insoluble in the solvent. The products obtained in the form of polymer solutions were diluted, when necessary, with a sufficient further amount of the above-mentioned solvent to form a solution of the resultant polymer which was of approximately 50 per cent by weight concentration. The Gardner-Holdt viscosity of the solution was determined. Plates of glass and panels of steel were dipped into the solution, removed, and permitted to stand at room temperature until the films thus deposited thereon were tack-free at room temperature. It was noted that the films adhered tightly to the plates and panels on which they were cast and that the films were satisfactorily hard and resistant to abrasion. After standing for three days, the films cast on glass were tested for tackiness at elevated temperatures by heating the same at 158° F. while pressing the film with a felt pad under a pressure of 260 grams per square inch for 2 hours. The pad was then removed and the film examined for adherence of felt fibers thereto. All of the films were substantially free of tack at said temperature. The following table gives the relative proportions by weight of the materials in each mixture subjected to polymerization and it also gives the per cent by weight of each alkenyl-aromatic compound in the starting mixture, expressed as per cent of the combined weight of all of the alkenyl aromatic compounds present. The table states the time of heating of each mixture at 150° C. in carrying out the polymerization and gives the Gardner-Holdt viscosity value of a 50 per cent solution of the polymeric product. It also gives the time of drying at room temperature of a film of such solution until the residual polymer film was non-tacky at room temperature. In the table, the abbreviations "LO," "S," "AMS," "EVB," "DVB," "Bz₂O₂" and "Solv." are used to designate the linseed oil, styrene, alpha-methyl-styrene, ethyl-vinylbenzene, divinylbenzene, benzoyl peroxide, and solvent, respectively.

takes place slowly and, when employing mixtures containing divinylbenzene in proportions smaller than are required by the invention, that the increase in viscosity is quite small. Runs 1–7 of the table show instances in which polymerization mixtures containing divinylbenzene in proportions smaller than are required by the invention were employed. Solutions of the products in 50 per cent concentration had Gardner-Holdt viscosities of B or less. Runs 15–19 describe experiments in which divinylbenzene was used in proportions greater than are permitted by the invention. In these instances, the polymers were obtained as solid gels which were substantially insoluble in the solvent employed. In runs 8–14, wherein divinylbenzene was used in the proportions required by the invention, the polymers dissolved readily in the solvent to form solutions which, when of 50 per cent concentration, had viscosities greater than B.

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. A method which comprises interpolymerizing one part by weight of linseed oil with between 0.5 and 1.2 parts of a mixture of alkenyl aromatic hydrocarbons having from 8 to 10 carbon atoms in the molecule and comprising a major proportion of styrene, from 0 to 35 per cent by weight of an alpha-alkylated styrene, and divinylbenzene in amount within a range of from:

$$\text{Per cent DVB} = 2 + 0.03143\ A$$

to $$\text{Per cent DVB} = 4 - 0.02571\ A$$

wherein DVB represents divinylbenzene and A is the per cent by weight of alpha-alkylated styrene in the mixture of alkenyl aromatic compounds, while the linseed oil and the alkenyl aromatic Table

| Run No. | Polymerization Mixture ||||||| Alkenyl Aromatic Components |||| Polymerization time, minutes | Product ||
| | Composition in parts by weight ||||||| |||| | Viscosity of 50% Sol'n. | Drying time, minutes |
| | LO | S | AMS | EVB | DVB | Bz₂O₂ | Solv. | S | AMS | EVB | DVB | | | |
| | | | | | | | | Per cent | Per cent | Per cent | Per cent | | | |
| 1 | 48 | 48 | 0 | 1.16 | 0.84 | 2 | 25 | 95.96 | 0 | 2.34 | 1.7 | 1,500 | A–B | 90 |
| 2 | 48 | 48 | 0 | 1.16 | 0.84 | 3 | 50 | 95.96 | 0 | 2.34 | 1.7 | 3,300 | A | 135 |
| 3 | 48 | 43 | 5 | 1.16 | 0.84 | 2 | 25 | 85.86 | 10.1 | 2.34 | 1.7 | 1,320 | A | 130 |
| 4 | 48 | 37 | 10 | 1.74 | 1.26 | 3 | 50 | 74.35 | 19.7 | 3.45 | 2.55 | 3,000 | A | 165 |
| 5 | 48 | 32 | 15 | 1.74 | 1.26 | 2 | 25 | 63.95 | 30.1 | 3.45 | 2.55 | 970 | A | 195 |
| 6 | 48 | 32 | 15 | 1.74 | 1.26 | 2 | 50 | 63.95 | 30.1 | 3.45 | 2.55 | 2,130 | A | 165 |
| 7 | 48 | 32 | 15 | 1.74 | 1.26 | 2 | 50 | 63.95 | 30.1 | 3.45 | 2.55 | 4,150 | B | 120 |
| 8 | 48 | 47 | 0 | 1.74 | 1.26 | 2 | 50 | 93.05 | 0 | 3.45 | 2.55 | 1,650 | E | 60 |
| 9 | 48 | 47 | 0 | 1.74 | 1.26 | 2 | 50 | 93.05 | 0 | 3.45 | 2.55 | 2,470 | G–H | 60 |
| 10 | 48 | 46 | 0 | 2.32 | 1.68 | 3 | 100 | 91.9 | 0 | 4.7 | 3.4 | 4,320 | D–E | 60 |
| 11 | 48 | 42 | 5 | 1.74 | 1.26 | 3 | 50 | 84.05 | 9.95 | 3.45 | 2.55 | 2,265 | B–C | 90 |
| 12 | 48 | 40 | 6.5 | 2.06 | 1.44 | 3 | 50 | 80.68 | 12.9 | 3.72 | 2.7 | 3,180 | P | 120 |
| 13 | 48 | 34 | 12.5 | 2.06 | 1.44 | 3 | 50 | 68.05 | 24.8 | 4.15 | 3.0 | 3,200 | B–C | 120 |
| 14 | 48 | 31.5 | 15 | 2.06 | 1.44 | 2 | 50 | 63.05 | 29.8 | 4.15 | 3.0 | 2,760 | D | 120 |
| 15 | 48 | 45 | 0 | 2.9 | 2.1 | 3 | 100 | 90.0 | 0 | 5.8 | 4.2 | 1,260 | Gel | |
| 16 | 48 | 40 | 5 | 2.9 | 2.1 | 2 | 50 | 80.1 | 9.9 | 5.8 | 4.2 | 480 | Gel | |
| 17 | 48 | 31 | 15 | 2.32 | 1.68 | 2 | 25 | 62.0 | 29.9 | 4.7 | 3.4 | 720 | Gel | |
| 18 | 48 | 30 | 15 | 2.9 | 2.1 | 2 | 50 | 60.2 | 29.8 | 5.8 | 4.2 | 810 | Gel | |
| 19 | 48 | 31 | 15 | 2.32 | 1.68 | 2 | 50 | 62.0 | 29.9 | 4.7 | 3.4 | 1,320 | Gel | |

From comparisons of run 6 with run 7 and of run 8 with run 9 it will be seen that the viscosities of 50 per cent solutions of the products usually increase somewhat as the time of polymerizing a given mixture is extended, but that the increase compounds are dissolved in a substantially inert solvent which is present in amount corresponding to between 20 and 60 per cent of the weight of the solution, the polymerization being accomplished by heating the solution at temperatures between 100° and 200° C. until at least 80 per cent by weight of the monomeric alkenyl aromatic compounds are reacted.

2. A method, as described in claim 1, wherein the alpha-alkylated styrene is alpha-methyl styrene, the latter is present in amount not exceeding 32 per cent of the combined weight of all of the alkenyl aromatic compounds, the mixture of alkenyl-aromatic compounds contains divinylbenzene in amount within a range of from:

Per cent DVB=2.2+0.02424 A to

Per cent DVB=3.6−0.01818 A and wherein the solvent is an organic liquid rich in aromatic compounds.

3. A method, as described in claim 2, wherein the polymerization mixture comprises a peroxide catalyst and the solvent is present in amount corresponding to between 35 and 50 per cent of the weight of the polymerization mixture.

4. An interpolymer of one part by weight of linseed oil, between 0.5 and 1.2 parts of a mixture of alkenyl-aromatic hydrocarbons having from 8 to 10 carbon atoms in the molecule and comprising a major proportion of styrene, from 0 to 35 per cent by weight of an alpha-alkylated styrene, and divinylbenzene in amount within a range of from:

Per cent DVB=2+0.03143 A to

Per cent DVB=4−0.02571 A wherein DVB represents divinylbenzene and A is the per cent by weight of alpha-alkylated styrene in the mixture of alkenyl aromatic compounds, which interpolymer is readily soluble in toluene to form a solution that, when of 50 per cent concentration, has a Gardner-Holdt viscosity greater than B.

5. An interpolymer, as described in claim 4, wherein the alpha-alkylated styrene is alpha-methyl-styrene, the latter is chemically combined in a proportion not greater than 32 per cent of the combined weight of all alkenyl-aromatic compounds chemically combined in the interpolymer, and divinylbenzene is chemically combined in a proportion within a range of from:

Per cent DVB=2.2+0.02424 A to

Per cent DVB=3.6−0.01818 A wherein DVB represents divinylbenzene and A is the per cent of alpha-methyl-styrene in the alkenyl aromatic compounds chemically combined in the interpolymer.

6. A varnish comprising a solution of the interpolymer of claim 4 dissolved in an organic solvent rich in aromatic hydrocarbons, which solution contains from 40 to 65 per cent by weight of said interpolymer.

7. A varnish comprising a solution of the interpolymer of claim 5 dissolved in an organic solvent rich in aromatic hydrocarbons, which solution contains from 45 to 55 per cent by weight of said interpolymer.

ARTHUR E. YOUNG.
HAROLD M. HOOGSTEEN.

No references cited.